United States Patent [19]

Kurz

[11] Patent Number: 4,514,874
[45] Date of Patent: May 7, 1985

[54] DEVICE FOR AUTOMATICALLY CONTROLLING THE SUCTION POWER OF A VACUUM CLEANER

[76] Inventor: Gerhard Kurz, Industriestrasse, 7261 Althengstett, Fed. Rep. of Germany

[21] Appl. No.: 473,572

[22] Filed: Mar. 9, 1983

[51] Int. Cl.³ .............................................. A47L 9/28
[52] U.S. Cl. ........................................ 15/319; 15/339
[58] Field of Search ........................... 15/339, 412, 319

[56] References Cited

U.S. PATENT DOCUMENTS

| | | | |
|---|---|---|---|
| 1,904,973 | 4/1933 | Smellie | 15/319 |
| 2,764,256 | 9/1956 | Allen | 15/319 X |
| 2,789,660 | 4/1957 | Brown | 15/319 X |
| 3,069,068 | 12/1962 | Hansen | 15/319 X |
| 4,021,879 | 5/1977 | Brigham | 15/319 |
| 4,199,838 | 4/1980 | Simonsson | 15/339 |
| 4,370,776 | 2/1983 | Kullik | 15/319 |

*Primary Examiner*—Chris K. Moore
*Attorney, Agent, or Firm*—McAulay, Fields, Fisher, Goldstein & Nissen

[57] ABSTRACT

A device for automatically controlling the suction power of a vacuum cleaner, in which at least one diaphragm-actuated vacuum switch is so arranged in the vacuum region of the vacuum cleaner that, depending on the variation in the air pressure as a result of external operating conditions, a contacting is produced which leads to a switching of the speed control range of the vacuum cleaner motor. The switching of the instantaneous suction power takes place in steps, two diaphragm switches having three contacts each being preferably provided.

16 Claims, 8 Drawing Figures

DEVICE FOR AUTOMATICALLY CONTROLLING THE SUCTION POWER OF A VACUUM CLEANER

BACKGROUND OF THE INVENTION

The invention relates to a device for automatically controlling the suction power of a vacuum cleaner.

Recently increased efforts have been undertaken to control the suction power produced by for instance household or industrial vacuum cleaners, or else to regulate it by taking into account actual external values which occur upon operation of the vacuum cleaner, since in many cases it is desirable to adapt the suction power produced to the operating conditions and the place of work. Operating a vacuum cleaner with only one speed, for instance at rated power, is seldom in accord with the practical requirements; it is uneconomical and wasteful of energy and permits neither the use of lower suction powers in most cases (for instance when light carpets or drapes are to be vacuumed) nor the use of a higher-power for brief use, should this be necessary or desirable.

In one known embodiment for controlling the vacuum produced by vacuum cleaners, constant rate of passage of the air through the apparatus is established by a small turbine driven by the stream of air of the vacuum cleaner located behind the blower. The turbine produces, in the manner, for instance, of a tachometer, a regulating voltage which is fed to a speed control device for the drive motor of the vacuum-cleaner blower. In this way it is possible to maintain the air flow, and therefore the quantity of air fed, approximately constant regardless of different suction conditions. It is possible for such a device also to respond automatically to an increasing amount of dust in the dust bag of the vacuum cleaner. The provision of a small regulating turbine is, however, very expensive as a result of its construction and it may also lead to problems upon daily use. In particular, the possibility cannot be excluded that the turbine, which lies continuously within the expelled stream of air of the vacuum cleaner, will gradually become clogged by residual quantities of dust or that its efficiency will be impaired by the hotter discharge air of the vacuum cleaner, as a result of which malfunctions of the entire system can then occur due to the closed control loop. Finally, it is not out of the question that upon the operation of a vacuum cleaner, operating conditions will frequently arise which make a merely constant flow of air neither necessary nor desirable. Furthermore, there is the disadvantage that with turbine control one can operate in the widest range only with one given power, so that regulation by means of a turbine driven by the stream of air can also be dispensed with.

In another known type of regulation of the suction power produced by a vacuum cleaner there is present, within the field of suction thereof, for instance in front of the dust bag or at some other suitable point, a diaphragm which is acted on by the vacuum prevailing there. The continuous pressure-dependent displacement of said diaphragm acts on a potentiometer which is a part of the control circuit for regulating the speed of rotation of the vacuum-cleaner motor. Since systems with semiconductor elements, for instance thyristors or the like operating by the phase-lag principle, are customarily used for the speed regulation of motors (the thyristors being connected in series with the supply terminals of the motor), the diaphragm-displaced potentiometer can be placed in the control circuit of the thyristor. Accordingly a given power of the vacuum-cleaner motor can be regulated depending on the existing vacuum. In this known device the regulation is such that with stronger vacuum in the suction region the power of the motor is decreased while with full flow of air and correspondingly low pressure the apparatus produces practically its entire power, as is, for instance, the case upon idling. Such a characteristic curve can also lead to undesired difficulties in other cases of use, for instance if the operator attempts by particulary firm application of the suction brush to obtain a better sealing of the brush with respect to the surface to be cleaned. As a result—as the user well knows—the vacuum conditions in the region of the brush can be increased to such an extent that very strong suctions can be produced which take up even firmly adhering fuzz, threads or the like. The known electronic controls prevent this, however, since in such a case of high vacuum, the power is reduced. Such a design may, however, be advantageous for the vacuuming of high-pile carpets or the like, in which case one cannot expect a strong sealing in the region of the suction and thus the occurrence of a greater vacuum but, on the other hand, a particularly high power is desired. Therefore, the design of the control curve for a given predetermined characteristic is a detrimental limitation since it is not possible in this way to satisfy all demands which exist as to the regulation of the suction power of a vacuum cleaner under different operating conditions.

Accordingly, one object of the present invention is to provide a simplified device for automatically controlling the suction power of vacuum cleaners and one which operates free of complications and with a high degree of reliability. A further object is to provide a vacuum cleaner which utilizes any desired characteristic curve of the suction power as a function of the actual value of the vacuum produced by the apparatus.

BRIEF DESCRIPTION

In one embodiment of the present invention a device for automatically controlling the suction power of a vacuum cleaner is provided which solves the problems encountered with prior art devices and has the advantage over the prior art that it responds in well-defined switch steps to an actual value, namely to that which is most important in the normal operation of a vacuum cleaner, and automatically selects and switches to the drive speed which is most favorable in the specific case for the blower motor of the vacuum cleaner. The switching between the individual speed and thus the power steps takes place without any delay, any desired number of switch steps being possible. At least one pneumatic diaphragm switch is provided which reacts to the change of vacuum and is of particularly simple construction. One advantageous embodiment of the invention, is so designed that in each case one diaphragm switch can assume preferably three different switch positions as a function of the vacuum. In order therefore to adjust, for instance, six different output steps, which is entirely sufficient for a vacuum-cleaner blower, only two diaphragm switches which are differetly adjusted are required.

It is particularly advantageous, furthermore, that upon the switching of the speed a band or strip of light, which may also consist of discrete individual lamps, can be so controlled that the operator is immediately informed which switch step of the suction power available is on at the time. The adaptation to the different circumstances takes place completely automatically. One advantgeous characteristic curve of the speed regulation of the vacuum-cleaner blower motor provides that with increasing vacuum in the suction region, measured, for instance, behind the vacuum-cleaner bag or the dust container, the speed of rotation and thus the suction power is increased. In this way, upon intentionally stronger pressing and thus sealing of the suction brush against the surface being worked there is obtained an increase in the suction power offered, so that difficult objects such as fuzz or threads can still be vacuumed up.

However, in accordance with one advantageous embodiment of the invention, it is also possible to design the characteristic curve in such a manner that downward regulation is effected upon an increase in the vacuum so that a particularly high flow of air is obtained when, with only a slight vacuum, the strongest vacuuming performance is required from the circuit of the invention. This may be advantageous for high-pile carpets. Another embodiment of the invention, contemplates that the vacuum cleaner does not give off its maximum output when idling. Therefore, the invention furthermore contemplates so arranging a throttle member of any desired shape and located preferably within the region of the handle of the vacuum cleaner so that in addition to this automatic regulation with reverse characteristic—high vacuum corresponds to low output—the throttle member can be actuated manually as desired in the in the case of only slight demands on the apparatus the air flow is throttled and thus the vacuum increased. At the same time the power can be reduced by the automatic response of the circuit. The manually actuatable throttle switch in the handle can be so designed that the throttling is maximum upon idling or upon the turning on of the apparatus, so that the vacuum cleaner initially operates with minimum power.

DESCRIPTION OF THE EMBODIMENTS

The basic concept of the present invention resides in automatically switching the suction power given off by a vacuum cleaner, depending on the demands made on the vacuum cleaner, by providing in the vacuum region produced by the vacuum cleaner itself at least one diaphragm-actuated vacuum switch which controls a speed control for the blower motor in switch steps whenever predetermined values of vacuum are reached.

Figures 1, 2:
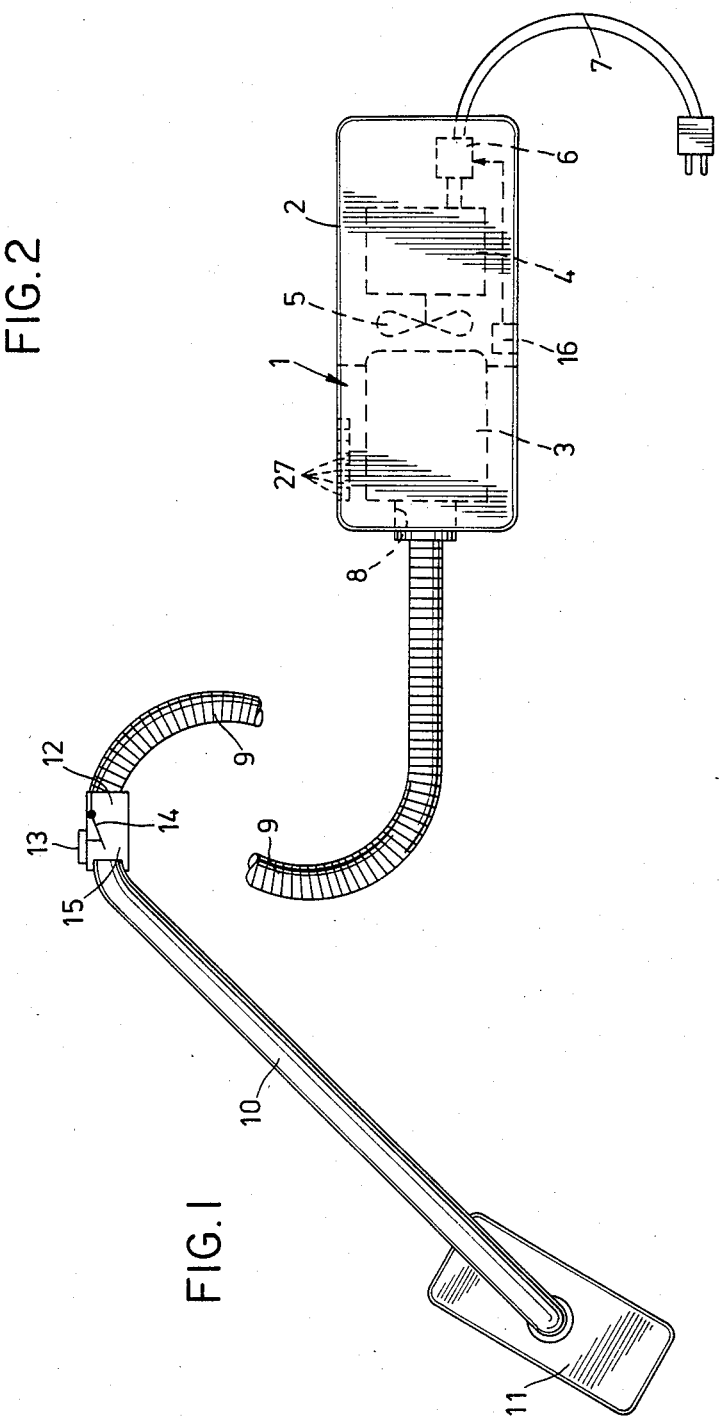
FIG. 1 shows diagrammatically a vacuum cleaner having a receiver in the main body of the vacuum cleaner which responds to variations in pressure.
FIG. 2 shows diagrammatically one possible embodiment of the control of a speed control circuit for the blower motor of the vacuum cleaner.

In FIG. 1, the body of the vacuum cleaner is designated 1; it comprises a housing 2 within which the dust-bag device 3, the blower 5 driven by the motor 4, and the electric or electronic speed control device 6 are arranged. An electric cord 7 is provided for connection to an external source of current; the suction mouth 8 of the vacuum cleaner is connected via a flexible plastic or metal hose 9 in customary manner with a rigid tube 10 bearing at its end a suction brush 11 or similar implement. At the transition between the flexible hose 9 and the rigid tube 10 a handle or guide member 12 which is grasped by the operator is provided in the embodiment shown.

Upon the operation of the vacuum cleaner, variations in vacuum occur depending on how firmly the region of the suction mouth, for instance in the case of the brush 11, is sealed off from the surrounding air. Firm sealing leads to an increase in the vacuum produced by the blower of the vacuum cleaner within the body of the vacuum cleaner, for instance behind the dust bag 3; and to an increase in the velocity of flow of the amount of air which flows past the increased seal of the suction brush 11.

Figure 4:
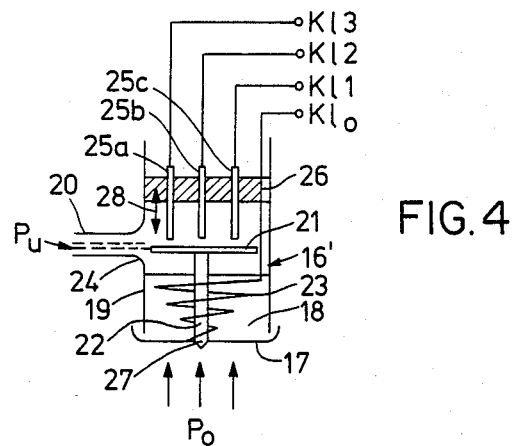
FIG. 4 shows one possible embodiment of a vacuum-responsive diaphragm switch which has a plurality of discrete switch positions.

The automatic control of suction power in accordance with the present invention responds to such variations in vacuum and has at least one or else a number of pressure sensors 16, which, in accordance with a preferred embodiment, may be developed in the manner shown diagrammatically in FIG. 4.

Therefore, to assure fuller understanding, the development of one of the vacuum-responsive sensors 16′ will first be described. Each pressure sensor 16′ consists in the simplest case of a housing opening 18 which is closed off on one side by a diaphragm 17 and surrounded by a wall 19. Via a connecting nipple 20 the inside of the housing 18 which is closed off by the diaphragm 17 can be fed a first pressure, customarily from the inside of the vacuum cleaner and in particular the vacuum Pu prevailing behind the dust bag 3. The normal atmospheric pressure Po can then, for instance, act on the outside of the diaphragm. Fastened to the diaphragm 17, or in any event mounted for displacement by the diaphragm in the direction of action of the diaphragm within the housing of the pressure switch 16′, there is a first contact member 21 which, in the embodiment shown, is developed as a contact plate which is both displaceable in the axial direction of action of the diaphragm and freely tiltable. In this embodiment, the contact plate 21 is pivoted or fastened to a push rod 22, said rod 22 in its turn being operatively connected to the diaphragm 17, which is movable under the influence of variations in vacuumm. The diaphragm 17 is urged towards the outside by a spring 23 in the embodiment shown, so that the contact plate 21 initially does not contact the mating contacts 25a, 25b, 25c . . . arranged within the housing 24 of the vacuum switch 16′.

A first embodiment of the pneumatic pressure switch has a common input terminal K1o which is electrically connected by a connecting line 26 to the spring 23 which, in its turn, is electrically connected to the push rod 22 at the point of action 27 by the diaphragm 17 on said rod. The push rod 22 is furthermore electrically connected to the contact plate 21.

The mating contacts 25a, 25b, 25c are arranged at a different axial distance from the contact plate 21 and in any event mounted axially displaceable within the housing in the direction indicated by the arrow 28 for adjustment, for instance in the manner that they can be screwed to a greater or lesser depth within the housing by means of an external thread.

It can be noted from this arrangement that, depending on the vacuum which prevails and is fed via the nipple 20 to the inside 18 of the housing and pulls the diaphragm 17 inward to a greater or lesser extent, the contact plate 21 selectively comes against and thus electrically contacts the mating contacts 25a, 25b, 25c, connecting them with the terminal K10. Actually, any desired number of mating contacts 25a, 25b, etc. having outwardly extended connecting terminals K11, K12, etc. can be provided, but it has proven advisable to use no more than three mating contacts for the contact plate 21 for each vacuum switch 16' since in this way an absolutely reliable successive contacting with the individual mating contacts is still possible, depending on the vacuum which prevails. The mating contacts 25a, 25b, etc. can be adjusted to given vacuum switch points so that, for instance, the terminal K10 is connected with the terminal K13 at a vacuum of 150 mm water column, contact is made between K10 and K12 at a pressure of 300 mm water column, etc.

By the provision of one or possibly several of such vacuum switches 16' a large number of possibilities are obtained for influencing the electrical or electronic speed control 6 for the motor 4. This speed control circuit 6 can, for instance, as known per se, be an electronic phaselag control which oprates on a series thyristor which is connected in series with the motor connection terminals. In the control circuit of the series thyristor, it is then possible, by suitable variation of a resistor Ro, to obtain greater or lesser modulation of the series thyristor and thus a corresponding increase in the power of the vacuum-cleaner blower motor 4. Referring to the showing in FIG. 2, it can be seen that such a change in potential in the control circuit for the speed control circuit can be obtained by connecting in parallel contacts $r_1$, $r_2$, etc. which, for example, increasingly add resistors R1, R2, R3, etc. to a base resistor Ro in the control circuit so that a reduction in the total resistance, or in any event a change in the conditions of the control circuit, can be obtained. The switch contacts $r_1$, $r_2$, etc. just mentioned can then be formed by the contact plate 21 on the one hand and its series of mating contacts 25a, 25b, etc. on the other hand, so as to obtain a stepwise contacting which effects given step-wise changes of power in the speed-control circuit, for instance upon an increase in the vacuum in the vacuum-cleaner system.

It is obvious at this point that by the provision of a vacuum-controlled diaphragm switch a large number of possibilities is obtained for changing the existing conditions in the control circuit of the speed-control circuit. For instance each of the contacts can also be galvanically insulated from each other by, for instance, dividing the contact plate 21 into segments which are insulated from each other. Associated with each mating-contact piece 25a, 25b is a practically directly adjacent contact piece which, however, is electrically insulated from it and has the same overall axial length accordingly with the vacuum step that causes the contact plate 21 to connect these two contact pieces with each other, the contact results. The contact plate is held tiltable or swingable on the push rod.

In this connection, the simultaneous control of lights or bulbs 27 of a series of lights which takes place upon each making of contact is particularly advantageous so that the user immediately knows in what power condition the apparatus is. The lights can, in this connection, be controlled in the form of a light strip which increases or decreases in length or else individually.

As lights there can be used, for instance, light-emitting diodes (LED) which are placed under the corresponding voltage upon the connecting of the resistors R1, R2, etc. or, in general, upon the selective change in the control circuit.

Figure 5:
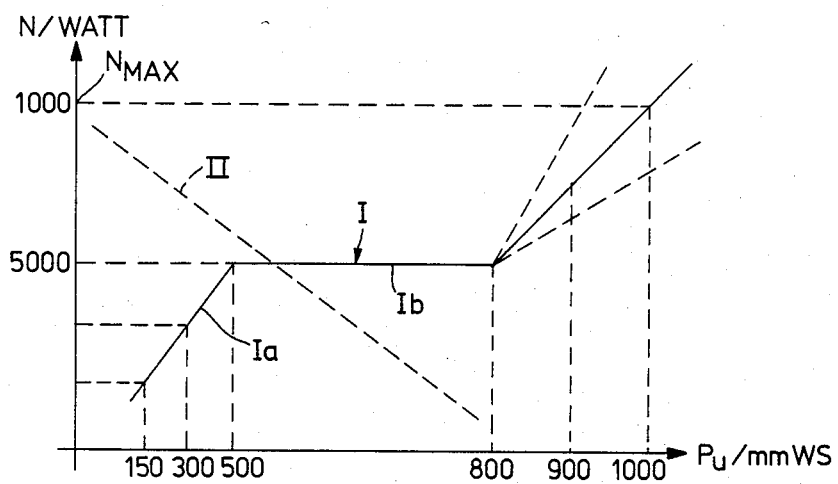
FIG. 5 shows graphically the power given off by the vacuum cleaner plotted over the vacuum produced by it on basis of two possible characteristic curves.

In accordance with one advantageous embodiment of the present invention, the adjustment of the contacting at the vacuum switch or switches 16' for the variation of the power takes place in accordance with the characteristic curve shown at I in FIG. 5, i.e. with a definite jump between two given values of vacuum at which the power given off by the vacuum cleaner is constant.

Thus, for instance, the adjustment can be so made at three contacts of a first vacuum switch that, corresponding to the first portion Ia, when given vacuum values are reached switching is in each case effected to a higher power—proportionally or in accordance with a desired course of curve, 20 to be sure, the power of the vacuum cleaner then remains, in a central portion Ib of the curve, at a constant value which continues, for instance, for vacuums between 500 mm water column and 800 mm water column. As from 800 mm water column, the control of the power can then again take place proportionally or in accordance with another curve by, the use of another diaphragm switch or contacts which are closed upon an increase in the vacuum. The reason for the point of inflection in the characteristic-curve switching is that it is preferable that upon a change in brush which, depending on the size and nature of the brush, may lead to different vacuum conditions in the vacuum cleaner, different powers are not also asked for. In general, such a point of inflection of the curve can also contribute to quieting the switch behavior, in which connection, in accordance with a further development of the present invention, delay times can also be introduced in the assuming of the switch movements of the contacts of the corresponding vacuum switch, which delay times consist of half a second or a second, so that there is no immediate change to a higher power during operation if, for instance, a short burst of vacuum suddenly takes place. Thus the control system can be stabilized and calmed, and switching takes place only when a correspondingly different power requirement results, based on the external conditions of the vacuum cleaning.

Figure 3:
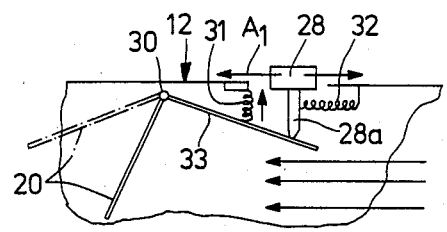
FIG. 3 is a partial diagrammatic illustration of the region of the handle, showing the throttling device for the flow of air for the production of the vacuum, the flow being evaluated by the automatic suction-power control circuit.

As already mentioned above, it is furthermore possible to effect the control of the suction power of a vacuum cleaner also with a descending characteristic curve in accordance with II in FIG. 5, which means that with a high vacuum the power given off by the vacuum cleaner is reduced. Such a rather unusual characteristic may be desireable in the case of frequent vacuuming of high pile carpets or similar floor coverings, in which the seal between the suction brush and the surface to be vacuumed is only slight but nevertheless considerable suction power is necessary. In order that, however, in the case of such a characteristic the vacuum cleaner does not continuously give off its maximum power when idling, it may be advantageous to provide here also a possibility of manual intervention which is shown diagrammatically in FIG. 3. In general, this possibility of manual action consists of a throttle member which is arranged in the region of the handle 12 of the vacuum cleaner and therefore can be actuated at any time as desired by the operator. With such a manually actuated throttle member the characteristic curve II of FIG. 5 is feasible since the throttle member can, for instance, be switched in such a manner that it automatically moves into a blocking position when the handle is not actuated or a slide switch 28, provided on the handle, is not brought into the desired position and held and/or locked fast there. The throttle member may itself be of any desired shape and development; for example, the throttle member may be a constriction which reduces the suction cross section on all sides in the region of the handle or, for instance, it may be the closure flap 29 shown in simplified form in FIG. 3, which is swingably mounted at 30. By pretensioning means 31, for instance a coil spring, the flap 29 can be automatically brought into the blocking position shown in solid line in FIG. 3 so that upon the turning on of the vacuum cleaner maximum vacuum is first of all detected by the vacuum sensors and the power is decreased in accordance with characteristic curve II. Depending on the requirements of the vacuum cleaning or what is desired, the operator can then correspondingly open the throttle member by means of the slide switch 28. The slide switch 28 in the embodiment shown has a valve stem 28a and is held in its position of rest by another tensioning spring 32. If the slide switch 28 is moved in the direction indicated by the arrow A1 then the valve rod 28a travels up over a slide lever 33 which is pivoted in the manner of a knee joint to the closure flap 29 and gradually opens the suction cross section so that the vacuum drops and the power is increased. This can be increased up to full opening of the flap 29, in which case the slide switch 28 can also preferably be locked in the specific position desired, for instance by pushing it laterally over detent projections. It is furthermore self-evident that the showing of FIG. 3 is merely purely diagrammatic and that the cam control effected by the slide switch should not be located within the flow of air but developed or covered in suitable manner so that large objects drawn in by the vacuum do not become lodged here. By such a vacuum control, which makes manual intervention possible, in combination with the descending line II, a particularly optimal control and regulation of the suction power can be obtained since information corresponding to the prevailing regulation can also be imparted by the manual intervention. With the ascending curve I, which preferably ascends in abrupt manner, manual intervention is not necessary but it may also be provided, in which case, however, in order to obtain an increase in power increasing manual throttling, and therefore the opposite movement to that described above with reference to FIG. 3, would have to be effected. It is furthermore pointed out that the provision of a manually actuated throttle member, preferably in the vicinity of the handle of the vacuum cleaner, with a generally descending characteristic curve of a vacuum cleaner control in itself is of independent inventive content.

It is furthermore self-evident that, if desired, it is also possible so to develop the individual diaphragm switches which respond to the vacuum and are preferably arranged behind the dust bag device 3, that they merely close a single contact; in that case, however, it is necessary to provide a number of diaphragm switches corresponding to the number of switch steps desired.

The delay in response for the power switching can be obtained in simple manner, for instance by the provision of an RC-member which is connected in the circuit path of the feeding of the potential to the speed control circuit 6, in such a manner that the new control potential can act on the control circiut, possibly via subsequent threshold value switches, only when sufficient potential has built up on the RC member.

Figure 6:
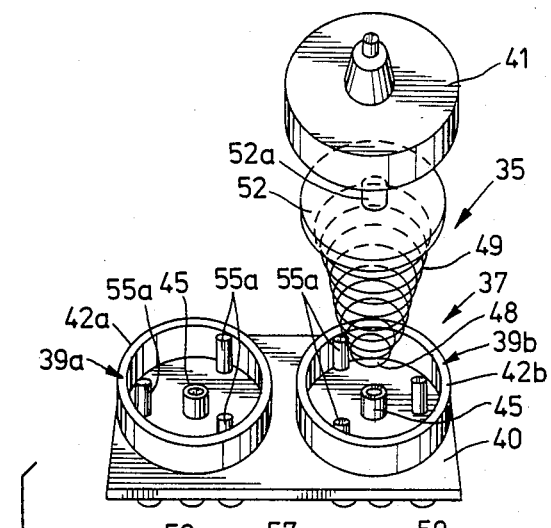
FIG. 6 is an exploded view in perspective of a preferred embodiment of a diaphragm-switch/printed-circuit unit for seven switch steps.
Figure 8:
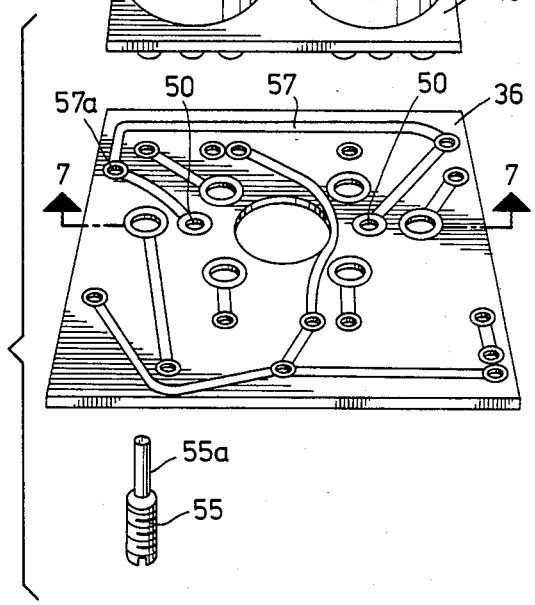
FIG. 8 is a view of the circuit board, seen from below, provided with its resistors and the adjustment possibilities from this side.
Figure 8:
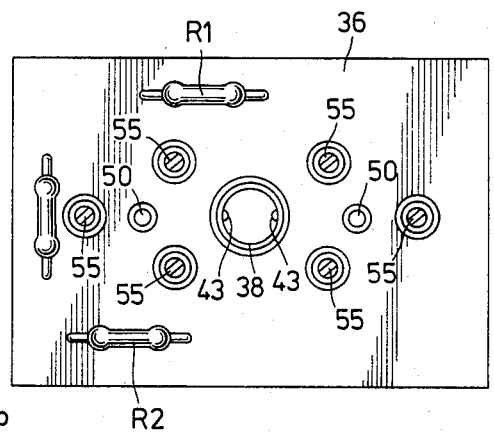
Figure 7:
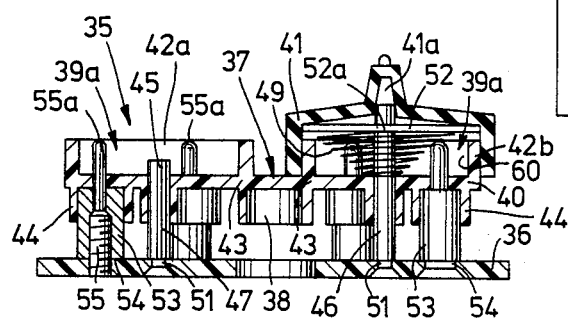
FIG. 7 is a section through the unit of FIG. 6 along the line 7—7.

One particularly advantageous embodiment of the present invention for the automatic control of the suction power is, finally, shown in FIGS. 6, 7 and 8. This embodiment permits control of the suction power in seven discrete steps and combines diaphragm switches and the other electric components in a compact, inexpensive and easily installed and adjusted manner so that it is then merely necessary to conduct two connecting wires from the single structural unit shown in FIGS. 6 to 8 to the actual speed control circuit 6, which wires can then be arranged in suitable proximity, for instance on the motor or directly in the current feed line, as shown in FIG. 1.

In the preferred embodiment shown in FIGS. 6, 7 and 8 the pressure-sensitive region of the diaphragm which responds to variations in vacuum is directly combined with a circuit-board mounting and adjustment region, as can best be noted from the sectional drawing of FIG. 7. The pneumatic-electric structural unit of FIGS. 6, 7 and 8 is designated generally by the reference number 35; it consists of the two main components, namely an electric circuit board 36 and a pneumatic diaphragm part 37 placed on the circuit board and fastened to it.

In the embodiment shown, the diaphragm part 37 has two diaphragm switch regions 39a, 39b which, while independent of each other, receive the vacuum prevailing at the time via a common connecting nipple 38 (FIG. 7), each of these diaphragm switch regions comprising three independent switches which switch at given vacuums. In this way there is obtained a total of seven discrete switch possibilities if one includes the base load adjustment which is characterized by a zero position of the diaphragm switches and is to this extent not influenced. It is self-evident that the pneumatic diaphragm part 37 may also have more than merely two diaphragm switch regions 39, as a result of which then, in each case, three additonal switch possibilities result as reaction to a varying vacuum. Ordinarily, however, the seven discrete switch possibilities provided by two diaphragm switch regions are sufficient.

The individual diaphragm switch regions 39a, 39b are formed as single-piece subdivisions developed on the diaphragm part 37; the diaphragm part 37 has a base plate 40 which supports the individual diaphragm switch regions 39a, 39b alongside of each other. Each diaphragm switch region 39a, 39b has an annular flange 42a, 42b on top and therefore on the side on which the diaphragm is then placed; this annular flange, together with the diaphragm 41 which is placed over it and held by clamping action, forms a closed housing cavity 60 (FIG. 7) to which the vacuum produced by the vacuum cleaner, and preferably, as already explained, the vacuum Pu prevailing behind the dust bag 3, is fed by the connecting nipple 38. For this purpose, the common support plate 40 of the diaphragm part 37 has two openings 43 which extend into the two housing cavities 42 and extend from the base of the connecting nipple 38 in this embodiment as oblique bores into the annular spaces enclosed by the annular flanges.

From the bottom of these annular spaces, the individual components serving for the electric contacting and the connection to the circuit board now extend into said annular spaces, as can best be noted from FIG. 6 and FIG. 7. FIG. 7 shows that at the places where these individual components penetrate into the annular space the support plate 40 forms downward directed integral annular extensions 44 each of which has a central bore within which the electrically conductive individual components are seated. In the diaphragm-switch regions 39a, 39b preferred here which have three switches responding at different vacuums there is provided in each case a central terminal 45 consisting of an elongated brass bar 46 which is inserted in the central holding extension 47 associated with it on the support plate 40 or is cast-in simultaneously upon the injection or casting process for the entire diaphragm part. It is self-evident that this brass rod 46 may also consist of some other suitable electrically conductive material. In accordance with a preferred embodiment, the first bar 46 which forms the central terminal has on both ends central countersunk boreholes which may also extend through the entire bar 46. In this way it is possible to connect on the one end, namely the upper end, the lower strongly spirally narrowed part 48 of the diaphragm pretensioning spring 49 (FIG. 6) firmly and furthermore also in electrically conductive manner to the central-connection bar 46 in the manner that by upsetting this bar around the countersunk bore the region 48 of the end of the spring and the part of the bar 46 extending beyond the support plate are practically riveted together. A similar possibility of attachment between the bar 46 and the circuit board 36 results from the fact that a lower tapered part of the bar 46 in which essentially also the sunk bore is located, is passed through an associated bore 50 in the circuit board and also riveted, together from below by the upset countersunk bore. By the shoulder shown at 51 (FIG. 6) the bar 46 is then seated on the circuit board and at the same time on a conductive coating 57 arranged there, so that a dependable electrical connection is obtained from the terminal point 57a of this conductive coating is produced first of all to the tensioning spring 49 which widens spirally in upward direction. At each diaphragm switch region, the electric contact chain is then supplemented by another contact plate 52 already mentioned above, which is pressed by the widest turn of the tensioning spring 49 in assembled condition of the pneumatic diaphragm part upward against the inner wall of the box-shaped diaphragm 41. In order to obtain a dependable seat, the contact plate 52 may also have a central pin 52a which engages centrally in a corresponding recess 41a on the diaphragm.

In order to complete the switching possibilities, the three mating contacts provided here are then arranged over the inner periphery of the annular space. For this purpose, first of all, individual contact sleeves 53 having an internal thread are introduced into the holding extensions 44 on the support plate 40. The contact sleeves do not continue into the annular space which forms the operating space acted on by vacuum of the corresponding multiple pneumatic diaphragm switch but terminate at a distance in front of said operating space, for instance at the lower edge of the support plate. The attachment of the contact sleeves—the three contact sleeves are then arranged at an angle of 120° apart over the inner periphery of the annular space—to the circuit board 36 takes place, or can take place, in a manner corresponding to that used in connection with the central terminal bar 46, namely by upsetting and corresponding riveting together. In this case also, a shoulder 54 of each contact sleeve 53 rests on the top against the circuit board and thereby simultaneously contacts correspondingly wide-area electric contact connections.

At the place where the contact sleeves protrude in each case downward on the bottom of each annular space, the annular space has a narrow passage opening; the actual mating contacts or contact pieces for the contact plate 52 are then formed by individual contact bars 55 which are screwed from below into the internal thread of each contact sleeve 53 and have an upper tapered unthreaded section 55a.

The bores in the bottoms of the annular spaces above each contact sleeve lead-through are intentionally kept smaller in their diameter than the diameter of the unthreaded extension 55a of each individual contact bar so that the further screwing of each individual contact bar into the contact sleeves in order to finally obtain a well-defined distance from the common oppositely located contact plate 52 at the same time leads to the contact extension 55a pressing itself through the narrower bore on the bottom of the sunken space which closes in sealing manner from all sides firmly around the contact extension. In this way assurance is had that, despite the adjustment possibilities within the annular space acted on by vacuum—which makes the possibility of displacement in axial direction of each individual contact bar 5 necessary—these annular spaces are absolutely tight and do not leak.

It can furthermore be seen that by the attachment by riveting or in other suitable manner of all contact sleeves, like the central terminal bars 46, a firm, immovable connection of the diaphragm part 37 to the circuit board 36 is obtained, the adjustment of the individual contact bars 55 being effected from the bottom of the circuit board and furthermore also being adapted to be corrected from there at any time.

There still remains the equipping of the circuit board, preferably on its bottom, with suitable resistors R1, R2, as shown in FIG. 2.

The inventive aspect of this diaphragm-part/circuit-board unit 35 therefore gives assurance that a compact diaphragm switch which permits of seven switch steps together with all electrical additonal circuits, resistors and the like necessary for this can be arranged at a predetermined place in the inside of the vacuum cleaner, for instance behind the dust bag, merely two connecting lines being required to the electronic speed control for the vacuum-cleaner motor.

What is claimed is:

1. A device for the automatic control of the suction of a vacuum cleaner having a motor, a dust container upstream of said motor whereby the suction produced by said motor causes dust to enter said container, and a speed control adjustment means connected to said motor, said device comprising: at least one vacuum-operated switch positioned in the vacuum region of the vacuum cleaner, said switch comprising a housing having an open end, and a diaphragm covering said open end and movable in response to changes in the vacuum, a contact plate in said housing; at least two contacts in said housing spaced at different distances from said plate; lead means connecting said plate and said contacts in circuit with said speed control adjustment means whereby the connection of said plate with said contacts effects variations in the speed of said motor, and mounting means tiltably mounting said contact plate on said diaphragm, whereby said plate is moved by said diaphragm into sequential connection with said contacts in response to increases in suction of the vacuum.

2. A device as defined in claim 1, in which said contact plate comprises a disc, and at least three contacts in said housing each one of which is spaced at a different distance from said contact plate, each one of said contacts being located on the circumference of a circle drawn through said contacts.

3. A device as claimed in claim 1, in which said contacts are threadedly engaged in said housing to permit the axial adjustment of said contacts with respect to said plate.

4. A device as defined in claim 1, in which said lead means includes a coiled biasing spring in said housing having one end connected to said plate and having the other end connected to said speed control adjustment means to electrically connect said plate with said speed control adjustment means, whereby said contact plate is connected to said contacts in respect to different vacuum levels to effect regulation of said speed control adjustment means.

5. A device as defined in claim 1, and a printed circuit board having a plurality of leads thereon, said vacuum switch being supported by said board, said contacts being electrically connected to selected ones of said plurality of leads.

6. A device as defined in claim 1, further comprising a light display device having individual illuminating means electrically connected to respective ones of said contacts, whereby the connection of said plate with said contacts effects the illumination of the respective illuminating means.

7. A device as defined in claim 1, and a printed circuit board having leads thereon, at least two vacuum-operated switches supported on said board, the contacts of each one of said switches being connected to respective ones of said board leads, and a common vacuum inlet port connected to each one of said switch housings.

8. A device as defined in claim 1, in which said vacuum cleaner is provided with a cleaning brush, and a handle connected between said brush and said dust container and having a passage therein to provide for the flow of air and dust therebetween; and a manually-operable throttle in said handle operable by an operator to manually control the suction power produced by said vacuum cleaner.

9. A device as defined in claim 8, in which said throttle comprises an opening in said handle to effect control of the suction power of said vacuum cleaner, and a movable flap closing said handle opening.

10. A device as defined in claim 9, in which said flap includes biasing means for normally biasing said flap to the closed position, and a slide mounted on said handle and movable into engagement with said flap in preselected steps to open said flap to correspondingly larger openings to control the suction power of said vacuum cleaner.

11. A device as defined in claim 1, and a printed circuit board having a plurality of leads imprinted thereon, said switch being mounted on said printed circuit board whereby said printed circuit board forms the bottom wall of said housing, and said contacts are respectively connected to preselected ones of said leads.

12. A device as defined in claim 11, and at least two switches mounted on said printed circuit board, said printed circuit board forming the bottom wall of each one of said two switches.

13. A device as defined by claim 12, wherein each one of said switches comprises an annular wall extending upwardly from said printed circuit board to define the outer wall of said housing, said lead means including an electrically conductive biasing spring in said housing having one end connected to said contact plate and the other end connected to one of said plurality of printed circuit leads, said biasing spring normally biasing said contact plate away from said contacts.

14. A device as defined by claim 13, in which each one of said contacts includes a threaded portion, and a corresponding threaded opening in said printed circuit board engaging the threaded portion of an associated contact, whereby each one of said contacts may be axially adjusted with respect to the associated contact plate to adjust the spacing between said contact and said contact plate.

15. A device as defined by claim 14, in which each one of said contacts extends outwardly of said housing to permit the adjustment of said contacts externally of said housing.

16. A device as defined by claim 15, in which said speed control adjustment means includes respective resistors serially connected with said contacts on said printed circuit board to effect speed control of said motor.

* * * * *